Patented Jan. 23, 1923.

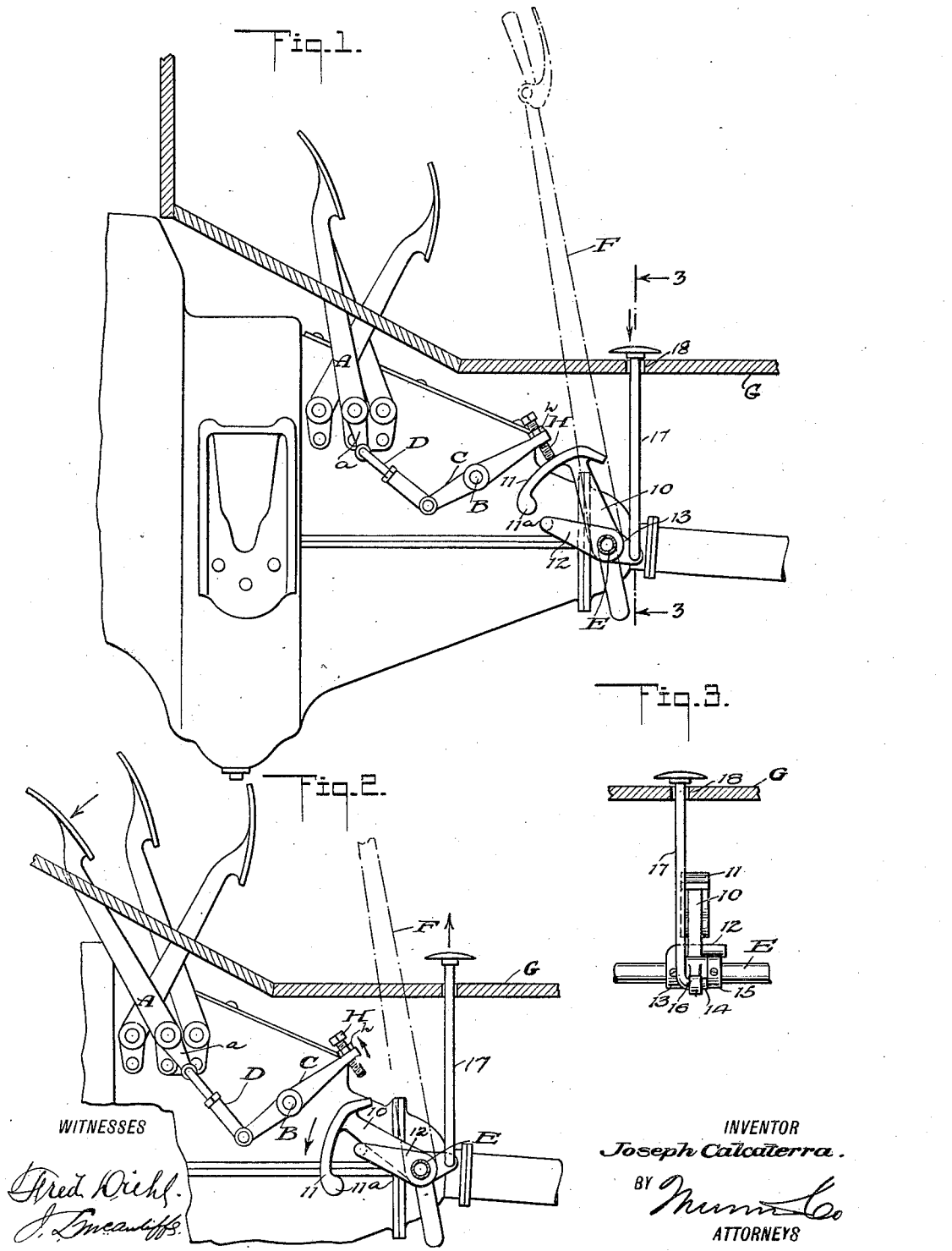

1,443,307

UNITED STATES PATENT OFFICE.

JOSEPH CALCATERRA, OF NEW YORK, N. Y., ASSIGNOR TO C. C. & F. MANUFACTURING CO., INC., OF NEW YORK, N. Y., A CORPORATION OF NEW YORK.

SAFETY DEVICE FOR THE CLUTCH-CONTROLLING MEANS OF AUTOMOBILES.

Application filed July 14, 1922. Serial No. 574,962.

*To all whom it may concern:*

Be it known that I, JOSEPH CALCATERRA, a citizen of the United States of America, and a resident of the city of New York, borough of the Bronx, in the county of Bronx and State of New York, have invented a new and Improved Safety Device for the Clutch-Controlling Means of Automobiles, of which the following is a description.

My invention relates to a means to prevent an automobile from accidentally creeping forward or running away.

The invention more particularly is intended in its preferred embodiment as an improvement on the safety device patented by me December 21, 1920, Number 1,363,082 and Number 1,363,083.

The general object of the present invention is to provide a safety device of the indicated character that may be subject to the control of the lever and controller shaft and yet adapted to be manually controlled.

Reference is to be had to the accompanying drawings forming a part of this specification, it being understood that the drawings are merely illustrative of one example of the invention.

Figure 1 is a side elevation of parts of an automobile equipped with my invention;

Figure 2 is a similar view showing the parts in release position;

Figure 3 is a sectional view as indicated by the line 3—3, Figure 1.

In the illustrated example A indicates the clutch lever of an automobile; $a$ an arm thereon connected through a connection D with an arm of lever C on the clutch shaft B to rock the latter; E indicates the controller shaft having the brake lever F and H indicates a screw on the lever C and having a nut $h$ for holding it in adjusted position, said screw and its nut being a known part in safety devices of the general character to which my invention relates. Coacting with the screw H is an element 10 loosely mounted on the controller shaft E or on an equivalent shaft adjacent the clutch shaft B, the mounting of said element 10 on the controller shaft bringing said element subject to the brake lever F. The upper arcuate end 11 which engages the screw H advantageously is overbalanced at one end as at $11^a$ to automatically restore the element 10 from the set position. On the shaft E is an actuating element 12 of L-shape secured by its hub 13 to shaft E at one side of the element 10, there being a set collar 15 at the opposite side. The arrangement is such that the actuating element 12 will turn with the shaft E while the element 10 will be moved by the element 12 with the rocking of shaft E in the reverse direction of the arrow, Figure 2. As in my patents above referred to when brake lever F is thrown to apply the brake, element 12 will throw element 10 to a position to be engaged by the screw H when the pedal lever A is thrown to the neutral position as in Figure 1 and prevent the clutch spring from accidentally throwing the automobile into high gear. When the brake lever F is thrown for turning the controller shaft E for brake release, said shaft will carry element 12 away from safety element 10 but will leave the latter engaged by screw H until clutch lever A is deliberately pressed to the low gear position which disengages screw H and permits element 10 to gravitate to release position.

In accordance with the present invention I provide a vertical pedal rod 17 the lateral bent end 14 of which is received in an eye 16 on element 10. Said rod 17 extends upwardly through a hole 18 in the floor G. Thus, a depression of the rod 17 by the foot of the driver serves to throw the element 10 to set position to be engaged by the screw H.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. In a safety device for automobiles embodying an element constrained to move to and from set position with the movements of the clutch lever to and from neutral position, a coacting element swingable to and from said set position, means to control said coacting element by the application of the brake and manually operable means to throw said coacting element to set position.

2. In a safety device for automobiles of the type embodying an element constrained to move to and from set position with the movements of the clutch lever to and from neutral position, a coacting element swingably mounted to move to or from a set position in engagement with the first-mentioned element, and manually operable means to throw said coacting element to set position.

JOSEPH CALCATERRA.